United States Patent [19]

Hahn et al.

[11] Patent Number: 5,206,271
[45] Date of Patent: Apr. 27, 1993

[54] EXPANDABLE STYRENE POLYMERS, AND AROMATIC-RESISTANT FOAMS PRODUCED THEREFROM

[75] Inventors: Klaus Hahn, Kirchheim; Uwe Guhr, Gruenstadt; Hans Hintz, Ludwigshafen; Hans Hoenl, Obersuelzen, all of Fed. Rep. of Germany

[73] Assignee: BASF Aktiengesellschaft, Ludwigshafen, Fed. Rep. of Germany

[21] Appl. No.: 856,756

[22] Filed: Mar. 24, 1992

Related U.S. Application Data

[62] Division of Ser. No. 606,314, Oct. 31, 1990.

[30] Foreign Application Priority Data

Nov. 3, 1989 [JP] Japan .................................... 3936596

[51] Int. Cl.$^5$ .............................................. C08J 9/16
[52] U.S. Cl. ..................................... 521/59; 264/45.4; 264/53; 264/DIG. 10; 521/56; 521/60; 521/139
[58] Field of Search ..................... 521/56, 59, 60, 139; 264/45.4, 53, DIG. 10

[56] References Cited

U.S. PATENT DOCUMENTS 3,558,534 1/1971 Niechwiadowiez ................. 260/2.5
3,996,311 12/1976 Westphal et al. .................... 260/880

FOREIGN PATENT DOCUMENTS 6513552 4/1967 Netherlands .
778102 7/1957 United Kingdom .
1182866 3/1970 United Kingdom .
1220611 1/1971 United Kingdom .

*Primary Examiner*—Morton Foelak
*Attorney, Agent, or Firm*—Oblon, Spivak, McClelland, Maier & Neustadt

[57] ABSTRACT

Expandable styrene polymers which contain from 10 to 90% by weight of a crosslinked styrene-diene copolymer containing from 2 to 45% by weight of the diene, and from 1 to 10% by weight of a $C_3$-to $C_6$-hydrocarbon as blowing agent can be processed to give foams which have high resistance to aromatics.

2 Claims, No Drawings

EXPANDABLE STYRENE POLYMERS, AND AROMATIC-RESISTANT FOAMS PRODUCED THEREFROM

This is a division of application Ser. No. 07/606,314, filed on Oct. 31, 1990.

The present invention relates to novel expandable styrene polymers for the production of aromatic-resistant foams.

Foams based on styrene polymers have achieved considerable industrial importance as heat-insulating and packaging materials. Due to their lack of resistance to aromatics, however, use of these foams in automobile construction is limited.

It is an object of the present invention to develop aromatic-resistant polystyrene foams.

We have found that, surprisingly, this object is achieved by mixture of polystyrene and crosslinked styrene-diene copolymers which give aromatic-resistant foams although the principal constituent polystyrene is soluble in aromatics.

The invention accordingly provides expandable styrene polymers which contain a) from 10 to 90% by weight of uncrosslinked polystyrene and/or an uncrosslinked copolymer containing 50% by weight or more of copolymerized styrene,
b) from 10 to 90% by weight of a crosslinked styrene-diene copolymer containing from 2 to 45% by weight of diene,
c) from 1 to 10% by weight, based on the sum of a) and b), of a $C_3$- to $C_6$-hydrocarbon as blowing agent, and, if desired,
d) conventional additives in effective amounts.

The invention furthermore relates to a process for the preparation of expandable styrene polymers of this type which comprises dissolving an uncrosslinked styrene-diene copolymer containing from 10 to 90% by weight of diene in styrene, polymerizing the material in aqueous suspension, and adding the blowing agent and, if used, the additives before, during or after the polymerization.

The invention furthermore provides foams having a density of from 0.005 to 0.1 g/cm$^3$ and containing a) from 10 to 90% by weight of polystyrene and/or a copolymer containing 50% by weight or more of copolymerized styrene,
b) from 10 to 90% by weight of a crosslinked styrene-diene copolymer containing from 2 to 45% by weight of diene, and, if desired,
c) conventional additives in effective amounts.

The principal component a) in the novel products comprises from 10 to 90% by weight, preferably from 20 to 80% by weight, in particular from 30 to 70% by weight, of polystyrene and/or a styrene copolymer containing 50% by weight or more, preferably 80% by weight or more, of copolymerized polystyrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, maleic acid and maleic anhydride. The polystyrene advantageously contains, in polymerized form, a small amount of a crosslinking agent which results in chain branching, i.e. a compound containing more than one, preferably 2, double bonds, such as divinylbenzene, butadiene or butanediol diacrylate. The crosslinking agent is generally used in amounts of from 0.005 to 0.05 mol. %, based on styrene. Component a) is uncrosslinked, i.e. is soluble in boiling toluene.

In order to achieve particularly high expandability, it is expedient for the styrene polymer to have a mean molecular weight $M_w$ (weight average), measured by the GPC method, of from 100,000 to 200,000, in particular from 130,000 to 180,000. The foam has improved processing properties if the high-molecular-weight edge of the molecular-weight distribution curve, measured by the GPC method, is so steep that the difference between the means ($M_{z+1}$-$M_z$) is less than 150,000. The GPC method is described in G. Glöckler, Polymercharakterisierung, Chromatographische Methoden Volume 17, Hüthig-Verlag, Heidelberg, 1982. The means mentioned are described in H.G. Elias, Makromoleküle, Hüthig-Verlag, Heidelberg, 1971, pages 52–64.

The styrene polymers which have the above-mentioned mean molecular weights can be obtained by carrying out the polymerization in the presence of regulators, expediently from 0.01 to 1.5% by weight, preferably from 0.01 to 0.5% by weight, of a bromine-free organic compound having a chain-transfer constant K of from 0.1 to 50. In order to achieve a steep high-molecular-weight edge of the molecular-weight distribution curve, the regulator is expediently not added until a conversion of from 20 to 90% has been achieved in the polymerization.

An advantageous high expansion capacity can also be achieved if component a) contains from 0.1 to 10% by weight, advantageously from 0.5 to 10% by weight, of a styrene polymer having a mean molecular weight (weight average) of from 500 to 5,000.

Further details on molecular weight regulation in the preparation of expandable styrene polymers are given in EP-B 106 129.

Styrene polymers which contain from 0.1 to 2% by weight, preferably from 0.15 to 1.5% by weight, of copolymerized acrylonitrile give foams which are substantially free from shrinkage. A mixture of from 95 to 99.5% by weight of polystyrene and from 0.5 to 5% by weight of a styrene-soluble styrene acrylonitrile copolymer also has these properties if the total acrylonitrile content in the mixture is from 0.1 to 2% by weight, preferably from 0.15 to 2% by weight.

Styrene polymers which contain from 2 to 15% by weight, in particular from 3 to 12% by weight, of maleic acid or maleic anhydride as comonomer give foams with high heat distortion resistance. The starting material here is advantageously a mixture of polystyrene and a commercially available styrene-maleic anhydride copolymer containing from 15 to 49% by weight of maleic anhydride; this can easily be prepared by dissolving the copolymer in styrene followed by polymerization.

As component b) which is essential to the invention, the novel products contain from 10 to 90% by weight, preferably from 20 to 80% by weight, in particular from 30 to 70% by weight, of a crosslinked styrene-diene copolymer containing from 2 to 45% by weight, preferably from 3 to 30% by weight, in particular from 5 to 20% by weight, of the diene. Examples of suitable products are styrene-isoprene copolymers, and in particular styrene-butadiene copolymers. The copolymers either have a random or advantageously a block structure. Graft copolymers are particularly suitable. The copolymers are distributed uniformly in the polystyrene matrix, presumably essentially as a network. A distribution of this type is obtained, for example, by starting from an uncrosslinked, styrene-soluble copolymer and polymerizing the styrene solution, during which the copolymer crosslinks while styrene molecules are simultaneously grafted onto the copolymer.

Component b) is crosslinked, i.e. insoluble in boiling toluene. The proportion of crosslinked component b) in the mixture of a) and b) can easily be measured by extracting the mixture with boiling toluene and determining the toluene-insoluble residue.

The mixture of components a) and b) should expediently have a melt flow index MFI 200/5.0 (in accordance with DIN 53 735) of from 0.2 to 15, advantageously from 0.3 to 8, in particular from 1 to 5 [g/10 min]. If the melt flow index is too low, the expandability is relatively low, and if the index is too high, the aromatics-resistance of the foam is unsatisfactory.

As blowing agents, the expandable styrene polymers contain from 1 to 10% by weight, preferably from 3 to 8% by weight, in particular from 5 to 8% by weight, based on the sum of a) and b), of a $C_3$- to $C_6$-hydrocarbon, such as propane, butane, isobutane, n-pentane, isopentane, neopentane and/or hexane. Preference is given to a commercially available pentane mixture.

The expandable styrene polymers may furthermore contain conventional additives in effective amounts, such as dyes, fillers, stabilizers, flameproofing agents, synergists, nucleating agents, lubricants, antistatics, substances which have an anti-adhesive effect on foaming, and agents for shortening the demolding time after final foaming.

Other suitable additives are poly(2,6-dimethyl)-1,4-phenylene ether and poly-1,4-phenylene sulfide. In amounts of from 1 to 20% by weight, based on component a), these additives increase the heat distortion resistance of the foam.

The expandable styrene polymers are generally in the form of particles, i.e. in the form of beads, granules or lumps and advantageously have a mean diameter of from 0.1 to 6 mm, in particular from 0.4 to 3 mm.

They can be prepared, for example, by mixing the components in the melt in an extruder, cooling the extrudate so rapidly that expansion does not occur, and subsequently comminuting the extrudate.

Preference is given to preparation by suspension polymerization in a conventional manner. To this end, the uncrosslinked styrene-diene copolymer and, if used, the additives are dissolved in styrene, and this solution is polymerized in aqueous suspension. A regulator and/or a small amount, from about 0.005 to 0.05 mol. %, based on styrene, of a crosslinking agent are advantageously added during the polymerization. The blowing agent can be added to the batch before, during or after the polymerization.

The uncrosslinked, styrene-soluble styrene-diene copolymer used to prepare the component b) distributed in a) is prepared in a conventional manner by copolymerizing styrene and a diene, such as butadiene or isoprene. It should contain from 10 to 90% by weight, advantageously from 15 to 80% by weight, in particular from 20 to 60% by weight, of copolymerized diene. Preference is given to styrene-butadiene block copolymers prepared by anionic polymerization. Branched or stellate block copolymers which are produced by coupling living polymers obtainable using organoalkali metal catalysts with multifunctional coupling agents and which contain, for example, from 20 to 45% by weight of the diene and have a viscosity number VN of from 50 to 130 [ml/g] (measured in 0.5% strength toluene solution) are preferred. Processes for the preparation of block copolymers of this type are described in U.S. Pat. No. 3,281,383 and British Patent 985,614. Crosslinking of the copolymer takes place during the polymerization of the styrene solution of the styrene-diene copolymer, and further styrene is generally grafted on at the same time. The proportion of crosslinked styrene-diene copolymer b) in the mixture of a) and b) is therefore generally greater than the amount of styrene-soluble uncrosslinked copolymer employed and its content of copolymerized diene is generally lower.

When the polymerization is complete, the bead-form expandable styrene polymers obtained are separated off from the aqueous phase, washed and dried.

To produce foams, the expandable styrene polymers are expanded in a conventional manner by heating to above their softening point, for example using hot air or preferably using steam. After cooling and possibly after interim storage, the foam particles obtained can be reexpanded by reheating. They can subsequently be welded in a conventional manner in molds which do not close gas-tight to give moldings.

The foams obtained have a density of from about 0.005 to 0.1 $g/cm^3$, preferably from 0.01 to 0.05 $g/cm^3$. Due to their elasticity, they are used, in particular, for shock-absorbent packaging, as the core material for automotive fenders, for internal paneling of motor vehicles, as a cushioning material, and as a heat- and sound-insulating material.

In the examples, parts are by weight.

EXAMPLES 1 TO 8

A mixture of 200 parts of water, 0.1 part of sodium pyrophosphate, 100 parts of a styrene solution containing the amounts indicated in the table of a branched styrene-butadiene star block copolymer (75/25% by weight), viscosity number 75 (ml/g), and the amounts indicated in the table of divinylbenzene, 7.0 parts of pentane, 0.15 part of tert-butyl peroxide, 0.45 part of benzoyl peroxide and 4 parts of a 10% strength aqueous solution of polyvinylpyrrolidone is heated to 90° C. with stirring in a pressure-tight stirred reactor, kept at 90° C. for 5 hours and subsequently heated at 100° C. for 2 hours and at 120° C. for a further 2 hours. After cooling, the bead polymer obtained having a mean particle diameter of about 1 mm was separated off from the aqueous phase, washed and dried.

The expandable styrene polymer obtained was prefoamed in a commercially available Rauscher-type stirred prefoamer, using flowing steam to a bulk density of about 20 g/l. After interim storage for 24 hours, the foam particles were welded in a Rauscher-type block mold by steam treatment at 1.8 bar to give a block of density about 20 g/l.

To test the oil- and aromatic-resistance, 5 cubes of the foam for each test, with an edge length of 5 cm, were stored for 72 hours in heating oil and toluene in accordance with DIN 53 428. The evaluation criteria are 0=unchanged, 1=slightly changed, 2=non-resistant.

In order to determine the content of crosslinked styrene-diene copolymer, a degassed sample which had been freed from blowing agent was powdered and extracted for 24 hours with boiling toluene in a Soxhlet extractor, and the toluene-insoluble content was determined.

The results are given in the table.

TABLE

| | Starting material [% by weight] | | | Component a) (toluene-soluble) [% by weight] | Component b) (toluene-insoluble) [% by weight] | Melt flow index MFI 200/5.0 DIN 53 735 of the mixture of a) and b) | Resistance of the foam | |
|---|---|---|---|---|---|---|---|---|
| Example | Styrene | Styrene-butadiene star block copolymer | Divinyl-benzene | | | | in heating oil | in toluene |
| 1 | 83 | 17 | — | 50 | 50 | 4.0 | 0 | 1 |
| 2 | 83 | 17 | 0.01 | 35 | 65 | 2.1 | 0 | 0 |
| 3 | 77 | 23 | — | 24 | 76 | 1.9 | 0 | 0 |
| 4 | 77 | 23 | 0.01 | 20 | 80 | 1.5 | 0 | 0 |
| 5 | 74 | 26 | — | 17 | 83 | 1.7 | 0 | 0 |
| 6 | 74 | 26 | 0.01 | 10 | 90 | 0.4 | 0 | 0 |
| 7 (comp.) | 100 | — | — | 100 | — | 9.9 | 2 | 2 |
| 8 (comp.) | 100 | — | 0.01 | 100 | — | 9.2 | 2 | 2 |

We claim:

1. A foam which has a density of from 0.005 to 0.1 g/cm$^3$ and contains
   a) from 10 to 90% by weight of uncrosslinked polystyrene and/or an uncrosslinked styrene copolymer containing 50% by weight or more of copolymerized styrene,
   b) from 10 to 90% by weight of a crosslinked styrene-diene copolymer containing from 2–45% of diene, and, optionally,
   c) conventional additives in effective amounts.

2. A process for the production of a foam as claimed in claim 1, which comprises expanding an expandable styrene polymer which contains
   a) from 10 to 90% by weight of uncrosslinked polystyrene and/or an uncrosslinked styrene copolymer containing 50% by weight or more of copolymerized styrene,
   b) from 10 to 90% by weight of crosslinked styrene-diene copolymer containing from 2 to 45% by weight of the diene,
   c) from 1 to 10% by weight, based on the sum of a) and b), of a C$_3$- to C$_6$-hydrocarbon as blowing agent, and optionally,
   d) conventional additives in effective amounts, wherein said expandable styrene polymer is in particulate form by heating to above the softening point, and welding the foam particles obtained to one another by heating in molds which do not close gas-tight.

* * * * *

UNITED STATES PATENT AND TRADEMARK OFFICE
CERTIFICATE OF CORRECTION

PATENT NO. : 5,206,271
DATED : April 27, 1993
INVENTOR(S) : Klaus Hahn et al.

It is certified that error appears in the above-identified patent and that said Letters Patent is hereby corrected as shown below:

On the title page, Item [30],

The Foreign Application Priority Data is incorrect, should read:

--Nov. 3, 1989 [DE] Fed. Rep. of Germany............3936596--

Signed and Sealed this

Seventh Day of December, 1993

*Attest:*

BRUCE LEHMAN

*Attesting Officer*     *Commissioner of Patents and Trademarks*